US012266484B2

(12) United States Patent
Li et al.

(10) Patent No.: US 12,266,484 B2
(45) Date of Patent: Apr. 1, 2025

(54) FORCE-SENSITIVE KEY MODULE AND FORCE-SENSITIVE SWITCH STRUCTURE THEREOF

(71) Applicant: Primax Electronics Ltd., Taipei (TW)

(72) Inventors: Che-An Li, Taipei (TW); Yi-Liang Chen, Taipei (TW); Lei-Lung Tsai, Taipei (TW)

(73) Assignee: Primax Electronics Ltd., Taipei (TW)

( * ) Notice: Subject to any disclaimer, the term of this patent is extended or adjusted under 35 U.S.C. 154(b) by 190 days.

(21) Appl. No.: 18/112,955

(22) Filed: Feb. 22, 2023

(65) Prior Publication Data

US 2024/0177949 A1 May 30, 2024

(30) Foreign Application Priority Data

Nov. 30, 2022 (TW) ................................ 111146026

(51) Int. Cl.
*H01H 13/14* (2006.01)
*H01H 13/20* (2006.01)

(52) U.S. Cl.
CPC ............ *H01H 13/14* (2013.01); *H01H 13/20* (2013.01)

(58) Field of Classification Search
CPC ........ H01H 13/14; H01H 13/20; H01H 13/10; H01H 13/02; H01H 13/04; H01H 13/704; H01H 13/7065; H01H 13/85; G06F 3/0202
USPC ........... 200/341, 5 A, 292, 293, 314; 341/22
See application file for complete search history.

(56) References Cited

U.S. PATENT DOCUMENTS

| | | | | |
|---|---|---|---|---|
| 7,045,722 | B2 * | 5/2006 | Tsai | H01H 13/85 200/5 R |
| 10,388,472 | B2 * | 8/2019 | Zhang | H01H 13/7057 |
| 10,534,473 | B2 * | 1/2020 | Schediwy | H03K 17/962 |
| 10,835,180 | B2 * | 11/2020 | Dervish | A61B 5/6804 |
| 11,099,656 | B1 * | 8/2021 | Chen | H01H 13/85 |
| 2016/0037633 | A1 * | 2/2016 | Downs | B32B 15/14 428/221 |

(Continued)

FOREIGN PATENT DOCUMENTS

JP 2003045274 * 2/2003 ............. H01H 13/14

OTHER PUBLICATIONS

Translation of JP2003045274 (Original document published Feb. 14, 2003) (Year: 2003).*

*Primary Examiner* — William A Bolton
(74) *Attorney, Agent, or Firm* — KIRTON McCONKIE; Evan R. Witt

(57) ABSTRACT

A force-sensitive key module and a force-sensitive switch structure are provided. The force-sensitive switch structure includes a first protective layer, a second protective layer, a first conductive layer, a second conductive layer and a force-sensitive layer. The first protective layer receives a pressing force. The second conductive layer is aligned with the first conductive layer. The force-sensitive layer is installed on the first conductive layer or the second conductive layer. When the first protective layer receives the pressing force, an electric connection between the first conductive layer and the second conductive layer is established, and the force-sensitive layer generates an analog sensing signal in response to the pressing force. When a magnitude of the pressing force is changed, the analog sensing signal is correspondingly changed according to an impedance change of the force-sensitive layer.

13 Claims, 3 Drawing Sheets

(56) References Cited

U.S. PATENT DOCUMENTS

| | | | | |
|---|---|---|---|---|
| 2018/0197697 | A1* | 7/2018 | Chen | H01H 13/705 |
| 2021/0250433 | A1* | 8/2021 | Liu | H01H 13/85 |
| 2021/0320659 | A1* | 10/2021 | Hsu | H03K 17/98 |
| 2022/0066608 | A1* | 3/2022 | Lee | G06F 3/04146 |
| 2022/0189716 | A1* | 6/2022 | Huang | H01H 13/023 |
| 2022/0316965 | A1* | 10/2022 | Hashimoto | G01L 1/20 |

* cited by examiner

FORCE-SENSITIVE KEY MODULE AND FORCE-SENSITIVE SWITCH STRUCTURE THEREOF

FIELD OF THE INVENTION

The present invention relates to a force-sensitive key module and a force-sensitive switch structure of the force-sensitive key module, and more particularly to a force-sensitive key module capable of generating an analog sensing signal and a force-sensitive switch structure of the force-sensitive key module.

BACKGROUND OF THE INVENTION

As known, computers such as desktop computers (e.g., personal computers) or notebook computers are essential tools in our daily lives. Moreover, keyboards are important input devices of computers. Via the keyboards, users can input characters or perform control operations. Generally, a keyboard comprises plural key structures. These key structures usually have the same structural design. Moreover, many electronic devices or electrical operation devices are equipped with key structures that are used as operation interfaces of performing various designated functions.

For allowing users to perform the input and control operations, the key structures of the keyboard are specially designed. For example, the key structure is returned to its original position in response to a single pressing action, and a triggering signal is generated in response to the pressing action. Consequently, the same key structure can allow the user to provide the next pressing action. Moreover, due to the compressible restoring mechanism of the key structure, the tactile feel of successfully pressing the key structure for the user is enhanced.

As for the conventional keyboards, the key structures are usually classified according to the types of the switches in the key structures. For example, the key structures are classified into some types, including mechanical key structures, membrane key structures, conductive rubber key structures and contactless electrostatic capacitive key structures.

Moreover, the key structure is usually equipped with a scissors-type connecting element under the keycap. Due to the scissors-type connecting element, the pressing force can be effectively and uniformly distributed. In addition, the key structure further comprises an elastic element (e.g., a spring or a rubber dome). Due to the restoring function of the elastic element, the scissors-type connecting element can be returned to its original position. Consequently, the key structure can be operated repeatedly.

In accordance with the circuitry structure and the digital signal processing operation, the triggering signal can be selectively in an on state or an off state. In the designated input mode (e.g., an English letter mode, a Chinese letter mode, a symbol mode or a combination key mode), the corresponding character input or function will be generated when the key structure is pressed, but no corresponding output will be generated when the key structure is not pressed. In other words, the triggering signal corresponding to the action of pressing the key structure is in the on state. Moreover, when the key structure is not pressed and the key structure is restored, it means that the triggering signal is in the off state. The two states of the triggering signal correspond to the digital values “1” and “0” only. In other words, the conventional technologies cannot provide or output other states of the triggering signal or more functions.

Therefore, it is important to improve the pressing actions of the key structures of electronic devices while achieving diverse or multi-level application effects.

SUMMARY OF THE INVENTION

An object of the present invention provides a force-sensitive key module and a force-sensitive switch structure of the force-sensitive key module. When a pressing force is received by the force-sensitive switch structure, the pressing force is converted into an analog sensing signal. According to the magnitude of the pressing force, the impedance value of the force-sensitive switch structure is correspondingly changed. Consequently, diverse or multi-level application effects can be provided.

In accordance with an aspect of the present invention, a force-sensitive switch structure is provided. The force-sensitive switch structure includes a first protective layer, a second protective layer, a first conductive layer, a second conductive layer and a force-sensitive layer. The first protective layer receives a pressing force. The second protective layer and the first protective layer are combined with each other and collaboratively formed as a covering structure. The first conductive layer is installed on an inner side of the first protective layer. The second conductive layer is installed on an inner side of the second protective layer. The second conductive layer is aligned with the first conductive layer. The force-sensitive layer is installed on the first conductive layer or the second conductive layer. When the first protective layer receives the pressing force, an electric connection between the first conductive layer and the second conductive layer is established, and the force-sensitive layer generates an analog sensing signal in response to the pressing force. When a magnitude of the pressing force is changed, the analog sensing signal is correspondingly changed according to an impedance change of the force-sensitive layer.

In accordance with another aspect of the present invention, a force-sensitive key module is provided. The force-sensitive key module includes a keycap, a pressing element and a force-sensitive switch structure. When a pressing force is provided to the keycap, the pressing force is transmitted through the keycap. The pressing element is located under the keycap. In response to the pressing force, the pressing element is moved downwardly to perform a pressing action. The force-sensitive switch structure is located under the pressing element. The force-sensitive switch structure includes a first protective layer, a second protective layer, a first conductive layer, a second conductive layer and a force-sensitive layer. The first protective layer receives the external force when the pressing action is performed by the pressing element. The second protective layer and the first protective layer are combined with each other and collaboratively formed as a covering structure. The first conductive layer is installed on an inner side of the first protective layer. The second conductive layer is installed on an inner side of the second protective layer. The second conductive layer is aligned with the first conductive layer. The force-sensitive layer is installed on the first conductive layer or the second conductive layer. When the first protective layer is pressed in response to the pressing action of the pressing element, an electric connection between the first conductive layer and the second conductive layer is established, and the force-sensitive layer generates an analog sensing signal in response to the pressing force. When a magnitude of the pressing force is changed, the analog sensing signal is correspondingly changed according to an impedance change of the force-sensitive layer.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

The present invention provides a force-sensitive key module and a force-sensitive switch structure of the force-sensitive key module. A first embodiment of the force-sensitive key module and the force-sensitive switch structure will be described as follows.

Figure 1:
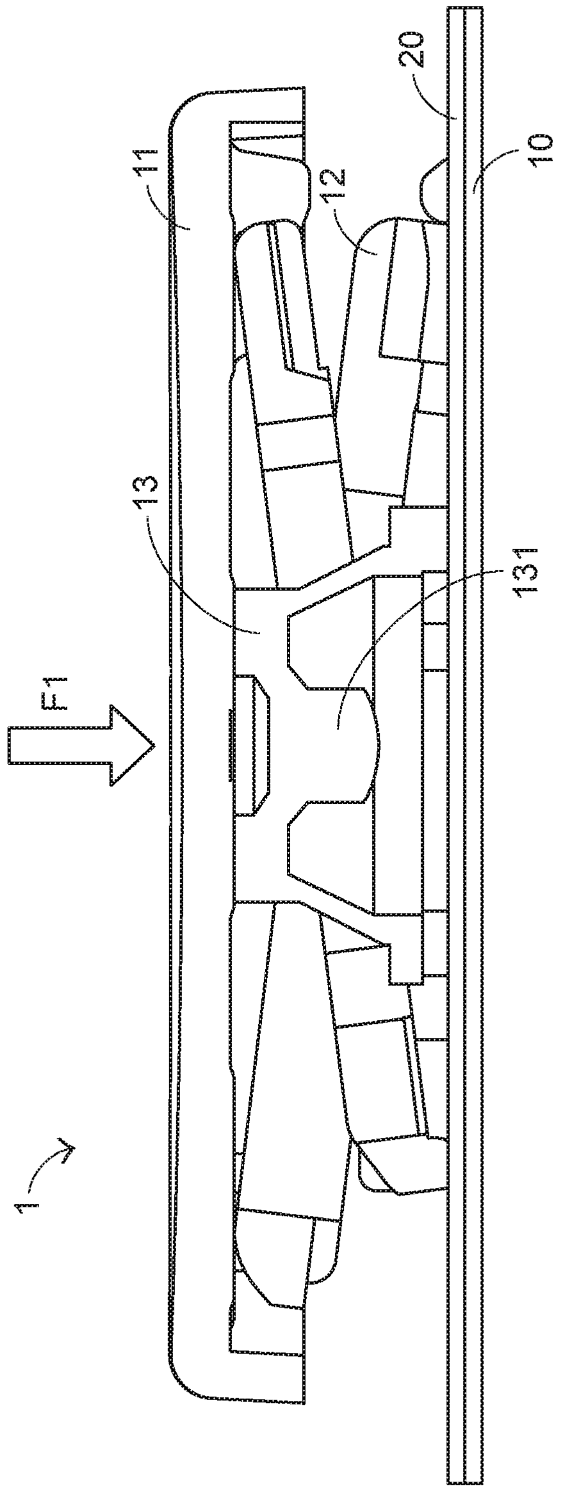
FIG. 1 is a schematic cross-sectional view illustrating a force-sensitive key module according to a first embodiment of the present invention.

FIG. 1 is a schematic cross-sectional view illustrating a force-sensitive key module according to a first embodiment of the present invention.

As shown in FIG. 1, the force-sensitive key module 1 comprises a keycap 11, a scissors-type connecting element 12, a pressing element 13, a force-sensitive switch structure 20 and a base plate 10. In FIG. 1, these components are sequentially arranged from top to bottom. The keycap 11 is located at the topmost side. When the keycap 11 is pressed in response to a pressing force F1, the pressing force F1 can be transmitted through the keycap 11. The scissors-type connecting element 12 and the pressing element 13 are located under the keycap 11. The scissors-type connecting element 12 is installed on the base plate 10. The force-sensitive switch structure 20 is located under the pressing element 13. The base plate 10 is located under the force-sensitive switch structure 20 to support the force-sensitive switch structure 20 and the pressing element 13.

The well-known connecting assembly with an X-structure is suitably used as the scissors-type connecting element 12. The use of the X-structure can effectively reduce the thickness of the force-sensitive key module 1. Moreover, since the pressing force F1 applied to the keycap 11 can be evenly distributed through the X-structure, the stabilized tactile feel can be provided. In an embodiment, the scissors-type connecting element 12 is an X-shaped bracket composed of two plate-shaped frame units, which are pivotally coupled to each other. That is, the two plate-shaped frame units are coupled with each other and rotatable relative to their central shafts. It is noted that the example of the scissors-type connecting element 12 is not restricted. In some other embodiments, the force-sensitive key module 1 is applied to a flexible keyboard. Under this circumstance, the scissors-type connecting element 12 may be omitted.

In an embodiment, the pressing element 13 is made of polyester, resin or any other appropriate elastic material. The pressing element 13 is located at a middle region of the scissors-type connecting element 12. Moreover, the shape and the location of the pressing element 13 respectively match the shape and the location of a force-sensitive layer 26 (see FIG. 2A) of the force-sensitive switch structure 20. For example, a bottom side of the pressing element 13 has a circular shape, and the force-sensitive layer 26 is located under the pressing element 13. Moreover, the pressing element 13 comprises a push part 131. When the pressing force F1 is generated, the pressing element 13 is subjected to compressible deformation in response to the pressing force F1. In addition, the push part 131 is moved downwardly to press the underlying force-sensitive switch structure 20. After the pressing force F1 is eliminated, the pressing element 13 is restored to its original shape.

Figure 2A:
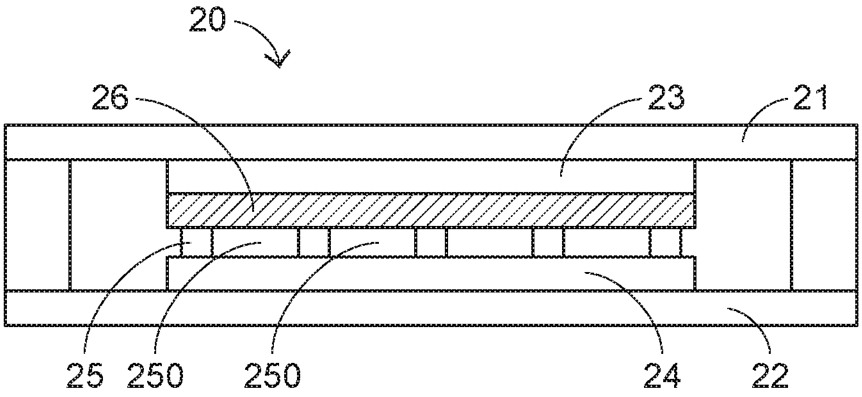
FIG. 2A is a schematic cross-sectional view illustrating an enlarged portion of the force-sensitive switch structure in the force-sensitive key module according to the first embodiment of the present invention.
Figure 2B:
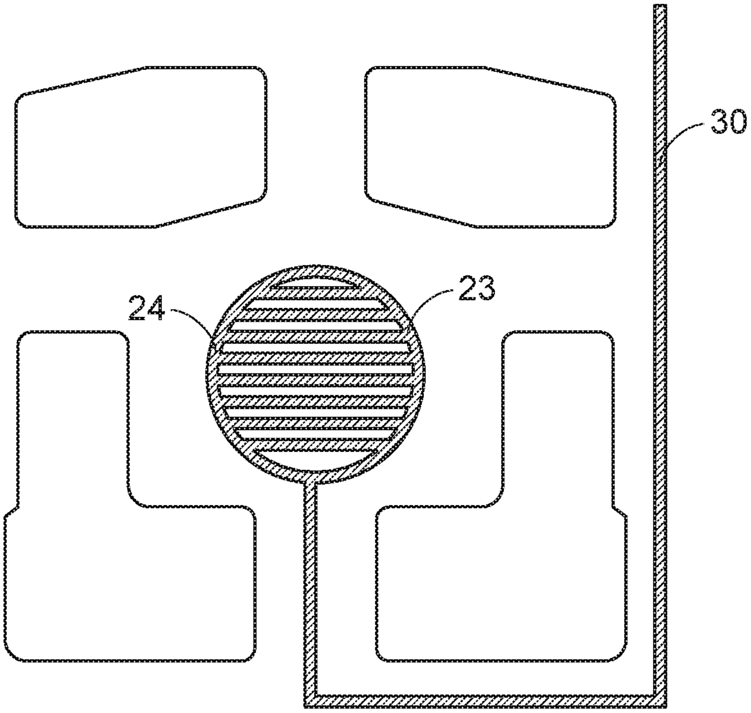
FIG. 2B is a schematic top view illustrating an enlarged portion of the force-sensitive switch structure in the force-sensitive key module according to the first embodiment of the present invention.

Please refer to FIGS. 2A and 2B. FIG. 2A is a schematic cross-sectional view illustrating an enlarged portion of the force-sensitive switch structure in the force-sensitive key module according to the first embodiment of the present invention. FIG. 2B is a schematic top view illustrating an enlarged portion of the force-sensitive switch structure in the force-sensitive key module according to the first embodiment of the present invention.

As shown in FIG. 2A, the force-sensitive switch structure 20 mainly comprises a first protective layer 21, a second protective layer 22, a first conductive layer 23, a second conductive layer 24 and a force-sensitive layer 26. In FIG. 2A, the relationships between these components from top to bottom are shown. The first protective layer 21 is located at the topmost side for receiving the pressing action from the pressing element 13. That is, when the keycap 11 is pressed, the pressing force F1 is transmitted from the keycap 11 to the pressing element 13. In response to the pressing force F1, the push part 131 of the pressing element 13 is moved downwardly to press the first protective layer 21.

The second protective layer 22 and the first protective layer 21 are combined with each other along the vertical direction and collaboratively formed as a covering structure. The first conductive layer 23 is installed on the inner side of the first protective layer 21. The second conductive layer 24 is installed on the inner side of the second protective layer 22. That is, the first conductive layer 23 and the second conductive layer 24 are covered by the two protective layers 21 and 22. Consequently, a membrane switch structure is formed. The installation position of the second conductive layer 24 is aligned with the installation position of the first conductive layer 23. Consequently, when the first protective layer 21 is pressed down in response to the pressing force F1, the electric connection between the first conductive layer 23 and the second conductive layer 24 can be established.

In this embodiment, the first protective layer 21 and the second protective layer 22 are made of a tough plastic material such as polyethylene terephthalate (PET). Consequently, when the pressing force F1 is transmitted to the first protective layer 21, the first protective layer 21 with considerable hardness can be subjected to a certain extent of deformation and pressed down, and the shape of the first protective layer 21 can be approximately maintained. The first conductive layer 23 and the second conductive layer 24 are made of conductive materials. For example, the first conductive layer 23 and the second conductive layer 24 are conductor line structures made of silver paste.

The force-sensitive switch structure 20 further comprises a separation layer 25. In this embodiment, the force-sensitive layer 26 with a single layer is installed on the first conductive layer 23. The separation layer 25 is installed on the force-sensitive layer 26. That is, the separation layer 25 is arranged between the force-sensitive layer 26 and the second conductive layer 24. The separation layer 25 is made of polyester, resin or any other appropriate elastic plastic material. Consequently, the separation layer 25 is not electrically conductive. When the pressing force F1 is not applied, the force-sensitive layer 26 and the second conductive layer 24 are separated from each other through the separation layer 25. Consequently, the first conductive layer 23 and the second conductive layer 24 are not electrically connected with each other. Moreover, the separation layer 25 provides the function of supporting the first conductive layer 23 and the first protective layer 21.

The separation layer 25 comprises plural vacant spaces 250. For example, the main body of the separation layer 25 is designed to have a spiral structure or a grid structure. Consequently, these vacant spaces 250 can be formed around the main body of the separation layer 25. Like the pressing element 13, the thickness of the separation layer 25 can provide the tactile feel when pressed. When the pressing force F1 is generated, the separation layer 25 is subjected to compressible deformation in response to the pressing force F1. Consequently, the overlying force-sensitive layer 26 can be contacted with the underlying second conductive layer 24 through the plural vacant spaces 250. Under this circumstance, the electric connection between the first conductive layer 23 and the second conductive layer 24 can be established.

In accordance with a feature of the present invention, the force-sensitive layer 26 is a force sensitive resistor (also referred as FSR). Moreover, the force-sensitive layer 26 is a conductive ink layer with the pressure sensitive property. Consequently, when the force sensitive layer 26 is contacted with the second conductive layer 24, the first conductive layer 23 and the second conductive layer 24 can be electrically connected with each other. Especially, according to the pressure or the weight applied to the force sensitive resistor or the change amount of the pressure or the weight, the impedance change force sensitive resistor can generate the corresponding impedance change (in the unit of ohms (52)). After the impedance change is converted into a voltage signal and the voltage signal is analyzed, the magnitude of the pressure or the weight can be realized.

Some experiments indicated that the impedance change and the applied force were positively correlated with each other. In the initial stage when the external force is applied, the resistance value is decreased. As the magnitude of the external force is increased, the resistance value is decreased and then maintained at the fixed resistance value. After the external force is eliminated, the resistance value is increased and then returned to its original value. Moreover, in case that the magnitude of the external force is identical, the smaller bottom area of the push part 131 (i.e., the area contacted with the first protective layer 21) is related to a larger reduction amount of the resistance value.

Please refer to FIGS. 2A and 2B again. In an embodiment, the first conductive layer 23, the force-sensitive layer 26 and the second conductive layer 24 have circular shapes. The sizes of the first conductive layer 23, the force-sensitive layer 26 and the second conductive layer 24 are nearly equal. Moreover, the first conductive layer 23, the force-sensitive layer 26 and the second conductive layer 24 are aligned with each other along the vertical direction. Moreover, the bottom surface of the push part 131 of the pressing element 13 also has a circular shape. The area of the push part 131 of the pressing element 13 is slightly smaller than the area of the first conductive layer 23, the area of the force-sensitive layer 26 and the area of the second conductive layer 24.

In case that the magnitude of the pressing force F1 is changed, the push part 131 is correspondingly subjected to compressible deformation. For example, if the magnitude of the pressing force F1 is increased, the deformation amount of the push part 131 is increased. Consequently, the contact area between the push part 131 and the first protective layer 21 is increased, and the reduction amount of the resistance value is correspondingly increased. On the other hand, after the pressing force F1 is increased to the target magnitude and then decreased, the associated structures are reversely restored to their original shapes and returned to their original positions. Under this circumstance, the resistance value is correspondingly and reversely retuned to its original value.

Due to this structural design, the force-sensitive layer 26 generates an analog sensing signal in response to the pressing force F1 when the first protective layer 21 receives the pressing force F1 and the first conductive layer 23 and the second conductive layer 24 are electrically connected with each other. In other words, when the force-sensitive layer 26 is contacted with the second conductive layer 24, the analog sensing signal is generated. However, when the magnitude of the pressing force F1 is changed, e.g., the contact area between the push part 131 and the first protective layer 21 is increased or the contact area between the force-sensitive layer 26 and the second conductive layer 24 is increased, the content of the analog sensing signal is changed, and the force-sensitive layer 26 is subjected to the impedance change.

In an embodiment, the first conductive layer 23 and the second conductive layer 24 are in communication with an analog-to-digital converter (also referred as ADC) (not shown) through an external circuit 30. The analog sensing signal is converted into a digital sensing signal by the analog-to-digital converter. The digital sensing signal is transmitted to a microprocessor (not shown). The digital sensing signal is processed into a control signal by the microprocessor. The force-sensitive key module 1 and the force-sensitive switch structure 20 can be applied to an associated electronic device such as a keyboard device. In other words, the analog-to-digital converter and the microprocessor may be built-in components of the keyboard device.

In accordance with another feature of the present invention, a content of the control signal is set according to the analog sensing signal corresponding to the impedance change of the force-sensitive layer 26. Consequently, one of multi-level control functions is controlled according to the control signal. Like the conventional technology, the pressing action of the same key structure can switch the state of the triggering signal between the on state and the off state. Especially, the change amount of the pressing force F1 can be obtained according to the impedance change. Consequently, the applications of the keyboard can be expanded according to the magnitude of the pressing force in the pressing action.

For example, in a usage scenario, the keyboard is used as an operation interface of a computer game. When a specified key is pressed by the user, the initial pressing action can be programmed to enable the function represented by the key. For example, the initial pressing action enables a single shot for a shooter game or enables a slow start for a racing game. When the same key is continuously pressed with a stronger pressing force by the user, a different control function is enabled. For example, the single shot mode in the shooter game is changed to a continuous shot mode, or the slow start mode in the racing game is changed to a shift acceleration mode.

Furthermore, the set number of the multi-level control functions is related to the sensitivity of the change amount of the applied pressing force that can be sensed. The programmer can define plural levels or plural stages according to the impedance change of the force-sensitive layer 26. Each level or stage corresponds to one force magnitude range, for example the range between 101 g and 200 g, or the range between 201 g and 300 g. Of course, more levels or stages of the sensitive force magnitude range indicate that more control functions can be set. It is noted that the set control functions are not restricted to the same type of multi-level control functions. In some other embodiments, the set control functions include different types of multi-level control functions.

Due to the design of the present invention, the pressing action of the same key structure can not only switch the state of the triggering signal between the on state and the off state, but also operate or control one of plural different states or functions. It is noted that the concepts of the present invention are not restricted to keyboards. For example, the concepts of the present invention can be applied to any other appropriate electronic device with a membrane structure.

It is noted that numerous modifications and alterations may be made while retaining the concepts of the first embodiment of the present invention. In a variant example, the first protective layer 21 and the second protective layer 22 have sufficient toughness. Under this circumstance, the separation layer 25 between the first protective layer 21 and the second protective layer 22 can be omitted. That is, since the surface strength of the first protective layer 21 is strong enough, the first conductive layer 23 and the force-sensitive layer 26 inside the first protective layer 21 can be supported by the first protective layer 21. In other words, the two conductive layers 23 and 24 will not be electrically connected with each other when the keycap 11 is not pressed. In this variant example, there is a gap between the first conductive layer and the second conductive layer, and the force-sensitive layer has a thickness. Moreover, it is necessary that the thickness of the force-sensitive layer is smaller than the gap.

In another variant example, the force-sensitive layer 26 as shown in FIG. 2A is installed on the underlying second conductive layer 24. After the separation layer is installed on the force-sensitive layer, the separation layer is aligned with the overlying first conductive layer. In other words, the separation layer is arranged between the force-sensitive layer and the first conductive layer. The efficacy of this variant example is similar to the efficacy of the first embodiment. Due to the arrangement of the separation layer, the first conductive layer and the second conductive layer are not electrically connected with each other when the pressing force is not applied. Moreover, the separation layer also provides the supporting function. Moreover, when the pressing force is applied, the underlying force-sensitive layer is contacted with the overlying first conductive layer through the vacant spaces of the separation layer. Consequently, the electric connection between the first conductive layer and the second conductive layer can be established.

In some other embodiments, the force-sensitive switch structure comprises more than one force-sensitive layer. An embodiment of the force-sensitive switch structure with more than one force-sensitive layer will be described as follows.

Figure 3:
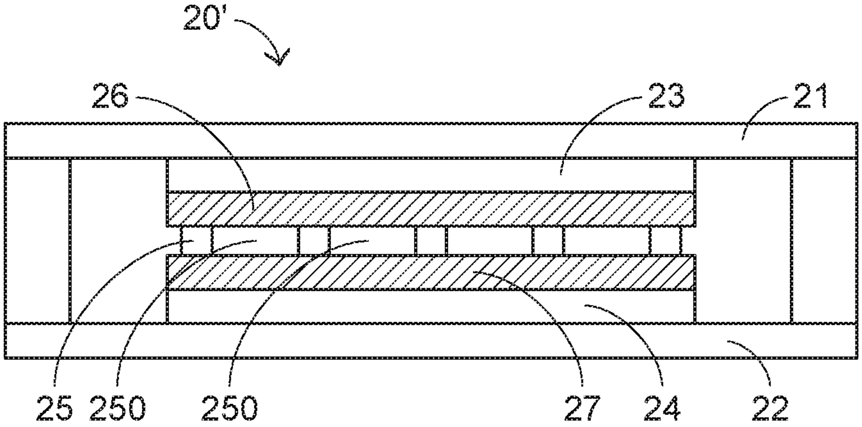
FIG. 3 is a schematic cross-sectional view illustrating an enlarged portion of a force-sensitive switch structure according to a second embodiment of the present invention.

A second embodiment of the force-sensitive switch structure will be described as follows. FIG. 3 is a schematic cross-sectional view illustrating an enlarged portion of a force-sensitive switch structure according to a second embodiment of the present invention.

In comparison with the first embodiment, the force-sensitive switch structure 20' of the second embodiment as shown in FIG. 3 comprises two force-sensitive layers 26 and 27. The locations of the components shown in FIG. 3 from top to bottom are similar to those shown in FIG. 2A. The force-sensitive layer 26 is installed on the first conductive layer 23. The force-sensitive layer 27 is installed on the second conductive layer 24 and opposed to the force-sensitive layer 26. The shape and the location of the force-sensitive layer 26 respectively match the shape and the location of the force-sensitive layer 27. Similarly, the shape and the location of the pressing element respectively match the shapes and the locations of the force-sensitive layers 26 and 27. Of course, in case that the force-sensitive layer 26 is installed on the second conductive layer 24 in the variant example of the first embodiment, the force-sensitive layer 27 is installed on the first conductive layer 23.

In this embodiment, the separation layer 25 is arranged between the force-sensitive layer 26 and the force-sensitive layer 27. Due to the arrangement of the separation layer 25, the two force-sensitive layers 26 and 27 are separated from each other when the pressing force is not applied. Moreover, the separation layer 25 also provides the supporting function. When the pressing force is transmitted to the first protective layer 21, the force-sensitive layer 26 can be contacted with the underlying force-sensitive layer 27 through the plural vacant spaces 250. Under this circumstance, the electric connection between the first conductive layer 23 and the second conductive layer 24 can be established. Moreover, each of the force-sensitive layer 26 and the force-sensitive layer 27 is a conductive ink layer with the pressure sensitive property. Consequently, the force sensitive layer 26 and the force-sensitive layer 27 have the force sensitive capabilities.

As mentioned above, both of the force sensitive layer 26 and the force-sensitive layer 27 have the capabilities of sensing the pressing force. Due to this structural design, the force-sensitive layer 26 and the force-sensitive layer 27 collaboratively generate the analog sensing signal. When the magnitude of the pressing force is changed, the impedance of the force-sensitive layer 26 and the impedance of the force-sensitive layer 27 are changed. Consequently, the analog sensing signal is correspondingly changed. Since two force-sensitive layers are used to sense the magnitude change of the pressing force, the precision or sensitivity is enhanced. That is, the range or extent of the impedance change is widened. In the subsequent pressing applications, the control functions corresponding to different ranges or extents of the impedance change can be set. Consequently, more levels or stages of the sensitive force magnitude range can be provided to response to the magnitude change of the user's pressing force.

From the above descriptions, the present invention provides the force-sensitive key module and the force-sensitive switch structure. In accordance with the conventional technology, the triggering signal corresponding to the action of pressing the key structure represents the on state, the off state, the digital value "1" or the digital value "0". When compared with the conventional technology, the technology of the present invention is improved. Due to the design of the present invention, the pressing action of the same key structure can not only switch the state of the triggering signal between the on state and the off state, but also operate or control one of plural different states or functions. Consequently, diverse or multi-level application effects can be achieved.

In other words, the force-sensitive key module and the force-sensitive switch structure of the present invention are capable of effectively overcoming the drawbacks of the conventional technologies and achieving the purposes of the present invention.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A force-sensitive switch structure, comprising:

a first protective layer receiving a pressing force;

a second protective layer, wherein the second protective layer and the first protective layer are combined with each other and collaboratively formed as a covering structure;

a first conductive layer installed on an inner side of the first protective layer;

a second conductive layer installed on an inner side of the second protective layer, wherein the second conductive layer is aligned with the first conductive layer; and a force-sensitive layer installed on the first conductive layer or the second conductive layer, wherein when the first protective layer receives the pressing force, an electric connection between the first conductive layer and the second conductive layer is established, and the force-sensitive layer generates an analog sensing signal in response to the pressing force, wherein when a magnitude of the pressing force is changed, the analog sensing signal is correspondingly changed according to an impedance change of the force-sensitive layer, wherein a keycap and a pressing element are located outside the first protective layer, wherein when the keycap is pressed, the pressing force is transmitted through the keycap, wherein the pressing element is arranged between the keycap and the first protective layer, the pressing element is subjected to compressible deformation to press the first protective layer in response to the pressing force, and the pressing element is restored to an original shape after the pressing force is eliminated, wherein a shape and a location of the pressing element respectively match a shape and a location of the force-sensitive layer.

2. The force-sensitive switch structure according to claim 1, wherein the first conductive layer and the second conductive layer are in communication with an analog-to-digital converter, wherein the analog sensing signal is converted into a digital sensing signal by the analog-to-digital converter, the digital sensing signal is transmitted to a microprocessor, and the digital sensing signal is processed into a control signal by the microprocessor.

3. The force-sensitive switch structure according to claim 2, wherein a content of the control signal is set according to the analog sensing signal corresponding to the impedance change of the force-sensitive layer, and one of multi-level control functions is controlled according to the control signal.

4. The force-sensitive switch structure according to claim 1, wherein the pressing element is made of an elastic material, and the elastic material is polyester or resin.

5. The force-sensitive switch structure according to claim 1, wherein the force-sensitive switch structure further comprises a separation layer, wherein the separation layer is installed on the force-sensitive layer, and the first conductive layer and the second conductive layer are not electrically connected with each other through the separation layer when the pressing force is not provided, wherein the first conductive layer and the first protective layer are supported by the separation layer.

6. The force-sensitive switch structure according to claim 5, wherein the separation layer comprises plural vacant spaces, wherein when the separation layer is subjected to compressible deformation in response to the pressing force, the force-sensitive layer is contacted with the second conductive layer or the first conductive layer through the plural vacant spaces, so that the electric connection between the first conductive layer and the second conductive layer is established.

7. The force-sensitive switch structure according to claim 5, wherein the separation layer is made of an elastic plastic material, and the elastic plastic material is polyester or resin.

8. The force-sensitive switch structure according to claim 1, wherein there is a gap between the first conductive layer and the second conductive layer, and the force-sensitive layer has a thickness smaller than the gap.

9. The force-sensitive switch structure according to claim 1, wherein the force-sensitive switch structure further comprises an additional force-sensitive layer, wherein the additional force-sensitive layer is aligned with the force-sensitive layer, and the additional force-sensitive layer is installed on the first conductive layer or the second conductive layer, wherein when the first protective layer receives the pressing force and the electric connection between the first conductive layer and the second conductive layer is established, the force-sensitive layer and the additional force-sensitive layer collaboratively generate the analog sensing signal in response to the pressing force, wherein when the magnitude of the pressing force is changed, the analog sensing signal is correspondingly changed according to the impedance change of the force-sensitive layer and an impedance change of the additional force-sensitive layer.

10. The force-sensitive switch structure according to claim 1, wherein the first protective layer and the second protective layer are made of a tough plastic material, and the tough plastic material is polyethylene terephthalate (PET).

11. The force-sensitive switch structure according to claim 1, wherein the force-sensitive layer is a conductive ink layer with a pressure sensitive property, wherein when the magnitude of the pressing force is changed, the force-sensitive layer is correspondingly subjected to the impedance change.

12. A force-sensitive key module, comprising:

a keycap, wherein when a pressing force is provided to the keycap, the pressing force is transmitted through the keycap;

a pressing element located under the keycap, wherein in response to the pressing force, the pressing element is moved downwardly to perform a pressing action; and a force-sensitive switch structure located under the pressing element, wherein the force-sensitive switch structure comprises:

a first protective layer receiving the pressing force when the pressing action is performed by the pressing element;

a second protective layer, wherein the second protective layer and the first protective layer are combined with each other and collaboratively formed as a covering structure;

a first conductive layer installed on an inner side of the first protective layer;

a second conductive layer installed on an inner side of the second protective layer, wherein the second conductive layer is aligned with the first conductive layer; and a force-sensitive layer installed on the first conductive layer or the second conductive layer, wherein when the first protective layer is pressed in response to the pressing action of the pressing element, an electric connection between the first conductive layer and the second conductive layer is established, and the force-sensitive layer generates an analog sensing signal in response to the pressing force, wherein when a magnitude of the pressing force is changed, the analog sensing signal is correspondingly changed according to an impedance change of the force-sensitive layer; and a separation layer, wherein the separation layer is installed on the force-sensitive layer, and the first conductive layer and the second conductive layer are not electrically connected with each other through the separation layer when the pressing force is not provided, wherein the first conductive layer and the first protective layer are supported by the separation layer.

13. The force-sensitive key module according to claim 12, wherein the force-sensitive key module further comprises a base plate, wherein the base plate is located under the force-sensitive switch structure, and the force-sensitive switch structure is supported by the base plate.

* * * * *